US012182814B2

(12) United States Patent
Reisgies et al.

(10) Patent No.: US 12,182,814 B2
(45) Date of Patent: Dec. 31, 2024

(54) SYSTEM AND METHOD FOR A SELF-CALCULATING TOKEN VAULT

(71) Applicant: TIS Inc., Tokyo (JP)

(72) Inventors: Hans Reisgies, San Jose, CA (US); Peter Milov, San Jose, CA (US)

(73) Assignee: TIS Inc., Tokyo (JP)

( * ) Notice: Subject to any disclaimer, the term of this patent is extended or adjusted under 35 U.S.C. 154(b) by 79 days.

(21) Appl. No.: 17/827,456

(22) Filed: May 27, 2022

(65) Prior Publication Data
US 2022/0284431 A1 Sep. 8, 2022

Related U.S. Application Data

(63) Continuation of application No. 16/736,597, filed on Jan. 7, 2020, now Pat. No. 11,348,105, which is a continuation of application No. 15/246,281, filed on Aug. 24, 2016, now Pat. No. 10,546,294.

(60) Provisional application No. 62/209,043, filed on Aug. 24, 2015.

(51) Int. Cl.
*G06Q 20/00* (2012.01)
*G06Q 20/38* (2012.01)
*G06Q 20/40* (2012.01)

(52) U.S. Cl.
CPC ....... *G06Q 20/4012* (2013.01); *G06Q 20/382* (2013.01); *G06Q 20/385* (2013.01); *G06Q 20/401* (2013.01)

(58) Field of Classification Search
CPC . G06Q 20/4012; G06Q 20/382; G06Q 20/385
See application file for complete search history.

(56) References Cited

U.S. PATENT DOCUMENTS

| 2010/0185545 | A1* | 7/2010 | Royyuru ............ G06Q 30/06 705/67 |
| 2012/0116902 | A1* | 5/2012 | Cardina ............ G06Q 20/10 705/17 |
| 2013/0145172 | A1 | 6/2013 | Shablygin et al. |
| 2014/0040139 | A1 | 2/2014 | Brudnicki et al. |
| 2015/0046339 | A1 | 2/2015 | Wong et al. |
| 2016/0203482 | A1 | 7/2016 | Huxham |

FOREIGN PATENT DOCUMENTS

| CA | 2753576 A | 9/2010 |
| KR | 20120136232 A | 12/2012 |
| WO | 2008059465 A2 | 5/2008 |
| WO | 2009001020 A1 | 12/2008 |
| WO | 2013155627 A1 | 10/2013 |
| WO | 2015022651 A1 | 2/2015 |

OTHER PUBLICATIONS

Extended European Search Report from related EP Application No. 16840061.2 mailed on May 6, 2019, 8 pages.
PCT International Search Report and Written Opinion from related PCT Application No. PCT/US2016/048463 mailed on Dec. 23, 2016, 11 pages.

* cited by examiner

*Primary Examiner* — Rokib Masud
(74) *Attorney, Agent, or Firm* — WOMBLE BOND DICKINSON (US) LLP

(57) ABSTRACT

A system and method for electronic payment that involves generating and then using a temporary token based on a legacy PAN (Primary Account Number) to conduct an electronic transaction. The token is generated by transforming the PAN using specific inputs such that the original PAN can be recovered by manipulating the token in various ways as disclosed herein. One potential manipulation that may be used is encryption/decryption. The token is transmitted to a portable electronic device such that the portable electronic device may present the token to a point-of-sale device. The POS communicates the token to a server which validates the token by, among other things, recovering the PAN. If the PAN is recovered as expected a validation message is returned to the POS device.

3 Claims, No Drawings

SYSTEM AND METHOD FOR A SELF-CALCULATING TOKEN VAULT

INCORPORATION BY REFERENCE

This application is a continuation of U.S. Ser. No. 16/736,597, filed Jan. 7, 2020, which itself is a continuation of U.S. Ser. No. 15/246,281, filed Aug. 24, 2016, which itself is a non-provisional application which claims priority from U.S. Ser. No. 62/209,043, filed Aug. 24, 2015, the disclosures of all of which are hereby expressly incorporated herein by reference in their entireties.

FIELD OF THE INVENTION

The present invention relates generally to the use of secure data to complete an electronic transaction, and more particularly to a system and method for obtaining and presenting a temporary use token in association with a portable electronic device, which preferably has the ability to communicate with a remote server.

BACKGROUND

Physical credit and debit cards have a number, usually 12-16 digits, which identify the card holder's account. This number is commonly referred to as the "PAN," which stands for "primary account number."

Financial institutions have begun asking for schemes that create a pool of temporary PANs that are assigned, used for a few times, than 'cooled off' and perhaps later reused. These temporary PANs are "physically" mapped in memory back to consumers' legacy card PAN on a one-to-one basis. A consumer may then use the temporarily assigned PAN in a purchase transaction. After the temporary PAN is input at the point of sale, the legacy card PAN is subsequently substituted for the temporary PAN—using a memory lookup—before the pending transaction is finally put through the legacy authorization process.

As these uses of temporary PANs grow, the need to store the one-to-one correlation mapping of temporary PANs to legacy card PAN will create a variety of problems for the industry. Among those potential problems will be the need for larger, more complex storage systems to hold the growing number of temporary PANs and the increased processor power necessary to search for and substitute legacy PANs for temporary PANs.

In a slightly different approach, some companies assign temporary PANs to electronic devices that stay fixed for the lifetime of the device, but the temporary PAN is still mapped back to the legacy consumer card PAN. Similarly, other third-party providers have bank-issued, mobile-device specific PANs, which stay fixed for the lifetime of the device and may not need any mapping during transaction processing. However, neither of these solutions provides the added security available with temporary PANs.

A system and method that can provide the security of temporary PANs without exponentially increasing the memory and processor requirements of the overall system would be desirable.

DETAILED DESCRIPTION

The present invention now will be described more fully with reference to specific exemplary embodiments to illustrate means by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention and its components may take the form of an entirely hardware embodiment, an entirely software embodiment or an embodiment combining software and hardware aspects. The following detailed description is, therefore, not to be taken in a limiting sense.

Portable Electronic Devices

The present invention provides a system and method that can be utilized with a variety of different portable electronic devices, including but not limited to PDA's, cellular phones, smart phones, laptops, tablet computers, and other mobile electronic devices that preferably include data service (preferably cellular-based, although WiFi connectivity would provide sufficient functionality for the present systems and methods) as well as preferably access to consumer downloadable applications and may even provide cellular voice. One such portable electronic device could be an iPhone from Apple (Cupertino, Calif.). Other examples of portable electronic devices may include, for example, Android-based smartphones (e.g. HTC Desire, LG G5, Motorola Droid, and Samsung Galaxy), Android-based tablets (e.g. Amazon Kindle Fire and Google Nexus 10), iOS-based tablets (e.g. iPad), Windows Mobile-based smartphones, Windows-based tablets (e.g. Microsoft Surface). However, it should be understood that the presently disclosed systems and methods are preferably platform and device independent. For example, the portable communication device technology platform may be Android, iOS, Microsoft Windows Mobile, Blackberry OS, Firefox OS, Sailfish OS, Symbian, Java or any other mobile technology platform. For purposes of this disclosure, the present invention has been generally described in accordance with features and interfaces that are generally found in association with smartphones utilizing a generalized platform, although one skilled in the art would understand that all such features and interfaces may also be used and adapted for any other platform and/or device.

The portable electronic device also preferably provides a mobile network interface to establish and manage wireless communications with a mobile network operator. The mobile network interface uses one or more communication protocols and technologies including, but not limited to, global system for mobile communication (GSM), 3G, 4G, LTE, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the mobile network of a mobile network operator. Accordingly, the mobile network interface may include as a transceiver, transceiving device, or network interface card (NIC).

The portable electronic device also preferably provides one or more short proximity electromagnetic communication devices, such as an NFC, RFID, or Bluetooth transceiver. It is presently preferred to use an NFC baseband that is Compliant with NFC IP 1 standards (www.nfcforum.org), which provides standard functions like peer-to-peer data exchange, reader-writer mode (i.e. harvesting of information from RFID tags), and contactless card emulation (per the NFC IP 1 and ISO 14443 standards) when paired with a secure element on the portable electronic device and presented in front of a "contactless payment reader." As would be understood in the art by those having the present specification, figures, and claims before them, the NFC IP 1 standards are simply the presently preferred example, which could be exported—in whole or in part—for use in association with any other proximity communication standard. It is further preferred that the portable electronic device include an NFC/RFID antenna (conformed to NFC IP 1 and ISO 14443 standards) to enable near field communications. However, as would be understood in the art NFC/RFID communications may be accomplished albeit over even shorter ranges and potential read problems. It is further contemplated that the mobile network interface and short proximity electromagnetic communication device could share a transceiver or transceiving device, as would be understood in the art by those having the present specification, figures, and claims before them.

The portable electronic device may further include a location transceiver that can determine the physical coordinates of device on the surface of the Earth typically as a function of its latitude, longitude and altitude. This location transceiver preferably uses GPS technology, so it may be referred to herein as a GPS transceiver; however, it should be understood that the location transceiver can additionally (or alternatively) employ other geo-positioning mechanisms, including, but not limited to, triangulation, assisted GPS (AGPS), E-OTD, CI, SAI, ETA, BSS or the like, to determine the physical location of the portable electronic device on the surface of the Earth.

The portable electronic device may further include a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. The portable electronic device includes one or more processors and mass memory, and may include additional logic circuits as may be required to support the various sub-systems of the device. The mass memory may include ROM, RAM as well as one or more removable memory cards. The mass memory provides storage for computer readable instructions and other data, including a basic input/output system ("BIOS") and an operating system for controlling the operation of the portable communication device.

The portable electronic device may further include a device identification memory dedicated to identify the device, such as a SIM card. As is generally understood, SIM cards contain the unique serial number of the device (ESN), an internationally unique number of the mobile user (IMSI), security authentication and ciphering information, temporary information related to the local network, a list of the services the user has access to and two passwords (PIN for usual use and PUK for unlocking). As would be understood in the art by those having the present specification, figures, and claims before them, other information may be maintained in the device identification memory depending upon the type of device, its primary network type, home mobile network operator, and the like.

Mobile Network Operator

The portable electronic device is preferably connected to at least one mobile network operator. The mobile network operator generally provides physical infrastructure that supports the wireless communication services, data applications and the secure transactional subsystem via a plurality of cell towers that communicate with a plurality of portable electronic devices within each cell tower's associated cell. In turn, the cell towers may be in operable communication with the logical network of the mobile network operator, POTS, and the Internet to convey the communications and data within the mobile network operator's own logical network as well as to external networks including those of other mobile network operators. The mobile network operators generally provide support for one or more communication protocols and technologies including, but not limited to, global system for mobile communication (GSM), 3G, 4G, LTE, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the portable electronic devices.

Retail Subsystem

Merchants have payment systems that allows for transaction processing of debit, credit, prepay and gift products of banks and merchant service providers via wide-area networks. When a consumer presents a payment credential to the merchant at a point of sale by, for example, tapping an electronic wallet on a reader, presenting a visual credential (e.g. bar-code) to a reader, swiping a magnetic stripe enabled card, or manually inputting a unique number associated with the credential, the credential data is transferred from the point of sale equipment via the network to confirm with the credential issuer (and/or servicer) that the credential is associated with sufficient funds and otherwise authorized to transact with the merchant. Where contactless card readers are used the data is transferred to the reader through the RF interface by the ISO 14443 standard and proprietary payment applications like MasterCard PayPass and Visa PayWave, which transmit the contactless card data from a card and in the future a mobile device that includes a Payment Subsystem. Merchants can also be considered any card issuer that validates its own cards through its own validation equipment. An example can include public transit operators validating transit fare cards on fare gates and fare validators. Another example includes property managers that issue access control cards for validation on door access readers.

The merchant's point of sale equipment may be connected to a merchant payment network via a wireless or wired connection. This point of sale network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the point of sale network may utilize any communication method that allows information to travel between the point of sale devices and financial services providers for the purpose of validating, authorizing and ultimately capturing financial transactions at the point of sale for payment via the same financial services providers.

Temporary Use Tokens

The present disclosure relates, in part, to a system and method for creating a temporary PAN (often referred to as a TOKEN) based on specific inputs, which can be subsequently verified and calculated back to the original PAN. This concept may be logically described as:

AAAAAA 01234567 BBBBBBBB<---->AAAAAA ZZZZZZZZ BBBBBBBB

With temporary PANs created in this manner there would be no need to store each (or even any) correlations between temporary PAN and legacy card PAN. Instead, the legacy card PANs—which already must be stored and maintained—are used in conjunction with other values (some of which vary over time) to dynamically create each temporary PAN. As discussed below, the dynamic creation of the temporary PAN or TOKEN requires various steps and transformations of data. As noted below, the steps are conducted at either or both the server (associated with payment subsystem) and/or the portable electronic device. In both instance, computer readable instructions and other data stored on the respective sub-systems (as discussed below) are implemented by the one or more processors associated with each of the server and the portable electronic device in association with various hardware components.

The system and method preferably uses well-recognized cryptography techniques to provide forward and reverse calculations. These cryptographic techniques are likely performed by software operating within the system. The cryptography approach used would preferably be 2-key triple DES. As would be understood in the art by those having the present specification, figures, and claims before them, AES encryption, among other potential cryptographic approaches could be used instead of DES encryption. Leveraging unique symmetric keys specific to each card that are generated and sent to devices is preferable as many cryptogram calculations can be executed with this implementation without ongoing connectivity to servers The card-level keys are preferably derived from a master key located at the issuer. The system and method disclosed in the present application employs these keys and existing card cryptography infrastructure for encryption/decryption.

Let C.sup.SK be the Cipher based on Secret Key, SK. Let C.sup.−SK be the Decipher (i.e. the opposite function of the Cipher) with the relationship being described as follows:

C.sup.SK("01234567")="*ZZZZZZZZ*";
C.sup.−SK("*ZZZZZZZZ*")="01234567";

Input parameters for creation of the token may include the consumer's PIN (or password), token creation date (TDATE) plus some random generated number (discussed below). The PIN or password may have been created, for example, during customer registration with the issuer or during registration of the specific portable electronic device with the issuer. As a result, the user's PIN (or password) will be known by both the customer and credential issuer (e.g. a bank), but should be an unknown to potential hackers and thieves. When the PIN (or password) is entered by the customer via the portable electronic device it is preferably sent to the issuer encrypted over the network.

Turning now to the card read-record-response data, which contains the PAN or TOKEN. This read-record-response data record is the credential that should be provided to POS terminal during a transaction. Thus, the POS-terminal is the first "authority" to accept or reject the transaction desired by the user of the credential. As such, the TOKEN must be properly formatted. To illustrate, we use EMV tag 57 (Track 2 Equivalent Data), which follows the following format:

5713 451223 8009379230 D 1509 201 9690002108001F
tag IIN/BIN pan token exp svc acc_param_index In the example above the tag '5713' is followed by six digits known as Issuer Identification Number (IIN or BIN). The primary account number (PAN) is '800937923'. Next digit—'0' is reserved for Luhn-check and should be calculated.

In a preferred approach, the system and method would keep the IIN digits in plain sight and intact. In this approach, that leaves only have nine digits to encrypt (i.e. 16-7). In cases where the PAN has a maximum number of digits=19, the system and method would have 19-7 or 12 digits left to encrypt. It is also preferred that the Luhn-check digit be re-calculated after transformation and appended to encrypted string.

It will be appreciated by those of ordinary skill in the art of encryption that a nine or twelve-digit string is really too short a string for strong encryption. Accordingly, in the present system and method it is preferred to prepend some random prefix like 'A6A6A6 . . . ' to the string before encryption. We'll call this operation "Pad(x)". It is contemplated that the padding operation would be used to bring string length to multiple of 128-bits. Besides adding length and complexity to the original string, padding has another benefit: after decryption the padding can be used to validate decrypted message by determining that it still contains the padded prefix (i.e. A6A6A6).

So now, following basic encryption we can think of the consumer's credential as having three parts (concatenated together):

S1=tag+IIN—(unencrypted)
S2=PAN—(encrypted preferably with padding)
S3=from separator 'D' till the end—(unencrypted)

In accordance with NIST recommendations sections S1 and S3 of the credential could also be included into transformation/encryption procedures as "tweaks" (i.e. strings that are added as a pre-prefix and/or postfix to the rest of a message, which are not themselves encrypted even though the tweaks play a role in encrypting part S2 of the credential)—that is a wrapper function interweaved with cipher coming into play. The wrapper function starts with S1 and transformation rounds will pick up S3 as a final input to transformation/encryption loops. These additions are important because they allow the system to differentiate 'AAA 01234567 BBB' from 'XXX 012345567 ZZZ'. So, TIN numbers are part of the solution though remaining as plain (i.e. unencrypted) text. The length of the tweaks may be chosen by the system developer with the understanding that the longer the tweak the more secure the encryption and more resistant it will be to inevitable hacker attacks.

Focusing again on the encryption of section S2, if the system were to apply standard AES message encryption algorithms to S2, the resulting output would contain 'A'-'F' hex digits, which would, in turn, likely lead to the overall token being rejected by POS terminals. While it is conceivable that future POS equipment and existing card processing infrastructure could be capable of accepting tokens that contain PANs with alphabetical symbols, we assume for present purposes that it would be difficult to replace all of the legacy POS terminals. Thus, we would need a transformation/encryption method which results in the original message length as well as the same set of characters/digits, such that POS terminals will accept generated tokens without problem. Format Preserving Encryption (FPE) methods are known with a number set forth in an article entitled "Recommendation for Block Cipher Modes of Operation: Methods for Format-Preserving Encryption" Natl. Inst. Stand. Technol. Special Publication 800-38G (July 2013), which is hereby incorporated in the present application by reference. In particular, the article discloses that:

Given any finite set of symbols, like the decimal numerals, FPE transforms data that is formatted as a sequence of the symbols in such a way that the encrypted form of the data has the same format and length as the original data. Thus, an FPE-encrypted SSN also appears to be an SSN.

As a result of the foregoing we reach the preferred method and associated system for generating the temporary token:

split the consumer's original credential (S) into three parts: S1, S2, S3
apply padding to S2 to create S2': S2'=Pad(S2)
concatenate the three resulting strings into one: S'=S1, S2', S3
wrap+encrypt S': C=WE(S')
select encrypted S2 part: CS2
calculate Luhn number for CS2 and append: CS2.parallel.L
concatenate all parts to form token, T: T=S1.parallel.CS2.parallel.L.parallel.S3

In some approaches to this systems and methods disclosed herein, additional security may be provided by introducing the concept of non-activated and activated tokens. Where available, the issuer would send to the customer's portable electronic device a non-activated token, which—because it is not activated—would not transact when presented to a POS terminal. As such, non-activated tokens would be useless to steal. Under this optional approach, the customer's portable device would calculate the value of the temporary PAN in time for the temporary PAN to be presented to the POS equipment. In this approach, token activation would consist of a crypto-transformation implemented at the very last moment of payment when a legacy card would have needed to provide read record data altogether with cryptogram(s).

When a non-activated token is sent to the portable electronic device the "activated" token may be calculated at about the same time based on the server secret. (The "activated" token will not be sent to the portable electronic device.) The server will preferably calculate a 7-digit server secret, PSUK, which would preferably be based on user PIN/password, a random number (generated in association with the server), and token creation date (TDATE), as follows:

PSUK=T(PIN, NNNN, TDATE)

Seven digits are preferred for the server secret to allow the system and method to employ the three bytes of CVC2 and four bytes of PIN in the data record to deliver PSUK or CSUK to the customer's portable electronic device.

On the server side of this ecosystem, certain data must be stored and the token must be generated. Accordingly, the server:

1. Stores consumer PIN/password in association with original/legacy PAN in operable association with server.
2. Stores TDATE (original token creation (expiration?) date) in association with the data stored in #1.
3. Calculates original CVC against original/legacy PAN (not necessarily stored).
4. Create and store the LUK (for Visa payment credential consumers) or the SUK (for MasterCard payment credential customers) with #1 and #2.
5. Generate PSUK (server secret): PSUK=T(PIN, NNNN, TDATE)
6. Generate ASUPAN (Activated PAN): ASUPAN=C.sup.SK(orig. PAN, PSUK)
7. Optional: Generate NASUPAN (Non-Activated PAN): NASUPAN=C.sup.SK(ASUPAN, PSUK)
8. Server sends Track 1 and Track 2 (i.e. ASUPAN (NASUPAN, where generated), PSUK, TDATE, LUK/SUK) to portable electronic device so that the portable device can go through card provisioning.

Mobile Activation

When the consumer is ready to use the temporary token for presentment at a point of sale terminal or any other token validation infrastructure, such as door access control reader, transit fare gate (POS), the consumer inputs their PIN (or password) into their portable electronic device, which is then transmitted to the server over an encrypted channel. If the server validates the PIN, it returns the PSUK and TDATE to the portable electronic device (preferably over the encrypted channel). The portable electronic device:

1. Encrypts CSUK from PSUK using LUK or SUK: CSUK=C(PSUK);
2. Calculates ASUPAN (Activated PAN): C.sup.−1 SK(NASUPAN, PSUK)=ASUPAN; and
3. Presents ASUPAN, CSUK, TDATE to the POS terminal.

Validation

The token (ASUPAN, CSUK, TDATE) presented to the POS terminal is then communicated using the standard payment network from the merchant to the issuer for validation. Upon receiving the ASUPAN, CSUK, TDATE, the server:

1. Decrypts CSUK using Master Key or UDK
PSUK=C.sup.31 1(CSUK)
2. Calculates Original PAN: C.sup.−1 SK(ASUPAN, PSUK)=Original PAN
3. Uses original PAN to
   a. Validate SUK
   b. Validate PIN
   c. Lookup original expiration date
   d. Validate original CVC2
   e. Validate TDATE
4. Calculates token score (i.e. an assessment of the probability that the card was hacked or stolen) to evaluate the risk associated with the transaction.
   a. Pass original PAN
   b. Pass original Date
   c. Pass original CVC2
   d. Pass token score This risk calculation may also consider the amount of the transaction being verified, the location of transaction being verified, and timing of transaction.
5. Send the result of verification (i.e. approved, declined) back to POS terminal.

The foregoing description merely explains and illustrates the invention without limiting the invention thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A method for electronic payment through use of a portable electronic device including an electromagnet communication device, a client-side processor, and a client-side non-transitory digital storage coupled to the client-side processor storing logic that when executed by the client-side processor causes the portable electronic device to:
   obtain a temporary token from a server via a network interface and store it in the client-side non-transitory digital storage, wherein the temporary token is generated by a server based on an original PAN by using a unique encryption key and one or more input parameters, wherein said one or more input parameters include an original PIN; and
   in connection with a given transaction at a point-of-sale device, accepting user input of the original PIN, and decrypting the temporary token using a unique decryption key and said one or more input parameters;
   using the portable electronic device to present the decrypted token to the point-of-sale device for the given transaction; and
   completing the given transaction once the point-of-sale device receives a validation message generated after the decrypted token is validated by the server using the unique encryption key and said one or more input parameters and validation that the original PIN has been correctly entered into the portable electronic device for the given transaction.

2. A method for electronic payment, comprising:
   generating a temporary token on a server based on an original PAN by using a unique encryption key and one or more input parameters, wherein said one or more input parameters include an original PIN; and
   transmitting the temporary token from the server to a portable electronic device via a network interface;
   receiving at the server a decrypted token from the portable electronic device in connection with a given transaction at a point-of-sale device, wherein the decrypted token was generated by the portable electronic device by decrypting the temporary token using a unique decryption key and said one or more input parameters;
   validating the decrypted token at the server using the unique encryption key and said one or more input parameters and verifying that the original PIN was correctly entered into the portable electronic device in connection with the given transaction; and
   returning a validation message from the server to the point-of-sale device.

3. A system for electronic payment, comprising:
   a portable electronic device including an electromagnetic communication device, a client-side processor, and a client-side memory accessible by the client-side processor storing computer readable instructions that when executed by the client-side processor causes the portable electronic device to:
   receive a temporary token from a server via a network interface and store it in a digital memory coupled to the client-side processor;
   in connection with a given transaction at a point-of-sale device, accept user input of a PIN, and decrypt the temporary token using a unique decryption key and one or more input parameters, wherein said one or more input parameters include the PIN; and
   present the decrypted token to the point-of-sale device for the given transaction; and
   a server including the network interface, a server-side processor, and a server-side memory accessible by the server-side processor storing an original PAN in association with a unique encryption key associated with the unique decryption key, and the PIN, the server-side memory also storing computer readable instructions that when executed by the server-side processor causes the server to
   generate the temporary token based on the original PAN by using the unique encryption key and said one or more input parameters;
   transmit the temporary token from the server to the portable electronic device via the network interface;
   receive the decrypted token from the portable electronic device in connection with the given transaction at the point-of-sale device;
   validate the decrypted token, using the unique encryption key and said one or more input parameters, if the decrypted token was generated by the portable electronic device by decrypting the temporary token using the unique decryption key and said one or more input parameters and verify that the PIN was correctly entered into the portable electronic device in connection with the given transaction; and
   return a validation message to the point-of-sale device.

* * * * *